US012566736B2

(12) United States Patent
Syed et al.

(10) Patent No.: US 12,566,736 B2
(45) Date of Patent: Mar. 3, 2026

(54) ORCHESTRATING DYNAMIC ACTIONS THROUGH MULTI-MODALITY INPUTS

(71) Applicant: Intuit Inc., Mountain View, CA (US)

(72) Inventors: Waseem Akram Syed, San Jose, CA (US); Umamaheswara Rao Kothuri, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 15 days.

(21) Appl. No.: 18/758,868

(22) Filed: Jun. 28, 2024

(65) Prior Publication Data

US 2026/0003833 A1     Jan. 1, 2026

(51) Int. Cl.
| | |
|---|---|
| *G06F 16/21* | (2019.01) |
| *G06F 3/0481* | (2022.01) |
| *G06F 16/215* | (2019.01) |
| *G06F 16/248* | (2019.01) |

(52) U.S. Cl.
CPC .......... *G06F 16/211* (2019.01); *G06F 3/0481* (2013.01); *G06F 16/215* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 10,686,673 | B1 * | 6/2020 | Murugesan ............. | H04L 41/20 |
| 10,915,970 | B1 * | 2/2021 | Wang ................... | G06Q 40/123 |
| 11,070,443 | B1 * | 7/2021 | Murugesan ......... | H04L 41/0806 |
| 11,647,095 | B1 * | 5/2023 | Barsade .............. | G06F 16/9574 |
| | | | | 709/217 |
| 12,417,250 | B1 * | 9/2025 | Sharma .................. | G06F 16/93 |
| 12,436,960 | B1 * | 10/2025 | Kulesza ............... | G06F 16/212 |
| 2010/0030525 | A1 * | 2/2010 | Dong ..................... | G06F 30/15 |
| | | | | 703/1 |
| 2012/0116984 | A1 * | 5/2012 | Hoang .................. | G06Q 10/10 |
| | | | | 705/317 |
| 2012/0158772 | A1 * | 6/2012 | Shafran ................ | G06F 16/254 |
| | | | | 707/769 |

(Continued)

OTHER PUBLICATIONS

Unified user interface design: designing universally accessible interactions (Year: 2004).*

(Continued)

*Primary Examiner* — Kim T Nguyen
(74) *Attorney, Agent, or Firm* — Dinsmore & Shohl LLP

(57) ABSTRACT

Certain aspects of the disclosure provide for processing multi-modality inputs to trigger dynamic actions. In examples, a method may include: receiving user input through one or more input modalities; converting the user input and one or more supported actions obtained from an actions repository into a unified schema; applying a set of moderation rules to the unified schema to generate a moderated input; generating a prompt based on the moderated input and one or more influencing examples; processing the prompt using one or more Large Language Models (LLMs) to obtain one or more matched actions and populated data models; augmenting the one or more matched actions with additional data; initiating one or more supported actions based on the one or more matched actions and populated data models; and generating a response to the user input based on results of executing the one or more supported actions.

20 Claims, 9 Drawing Sheets

(56)  References Cited

U.S. PATENT DOCUMENTS

| | | | |
|---|---|---|---|
| 2017/0060911 A1* | 3/2017 | Loscalzo | G06F 16/258 |
| 2018/0068302 A1* | 3/2018 | Wang | G06Q 20/027 |
| 2019/0318413 A1* | 10/2019 | Schulz | G06Q 30/0633 |
| 2022/0028020 A1* | 1/2022 | Wray | G06Q 10/1053 |
| 2022/0392451 A1* | 12/2022 | Dai | G06F 40/35 |
| 2023/0394478 A1* | 12/2023 | Fuentes | G06N 20/00 |
| 2025/0225343 A1* | 7/2025 | Yu | G06F 40/58 |
| 2025/0245092 A1* | 7/2025 | Gallagher, Jr. | G06F 11/0793 |
| 2025/0254240 A1* | 8/2025 | Greenberg | H04M 3/5183 |
| 2025/0265522 A1* | 8/2025 | Jagmohan | G06F 40/20 |
| 2025/0307067 A1* | 10/2025 | Cho | G06F 11/0736 |
| 2025/0307688 A1* | 10/2025 | Li | G06N 20/00 |

OTHER PUBLICATIONS

Testing the Limits of Unified Sequence to Sequence LLM Pretraining on Diverse Table Data Tasks (Year: 2023).*

* cited by examiner

Module Registry
120

| User Element 304A | Action 302A |
| User Element 304B | Action 302B |
| User Element 304C | Action 302C |
| User Element 304N | Action 302N |

*FIG. 3*

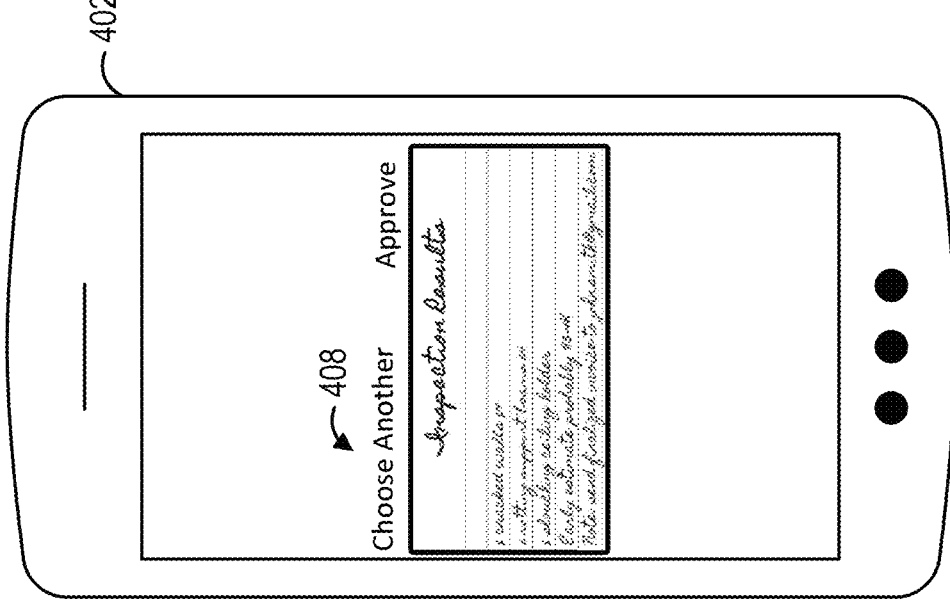
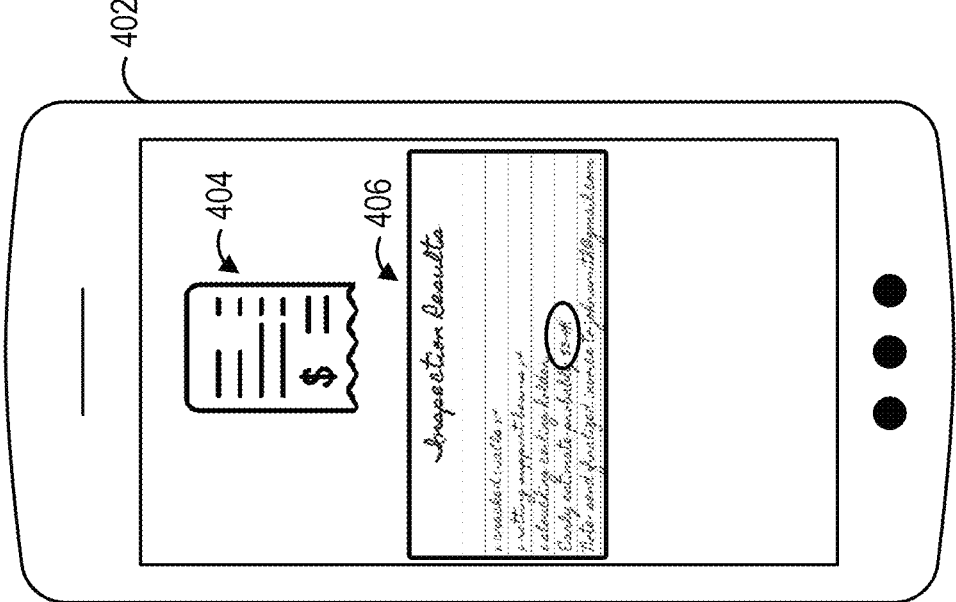
*FIG. 4A*

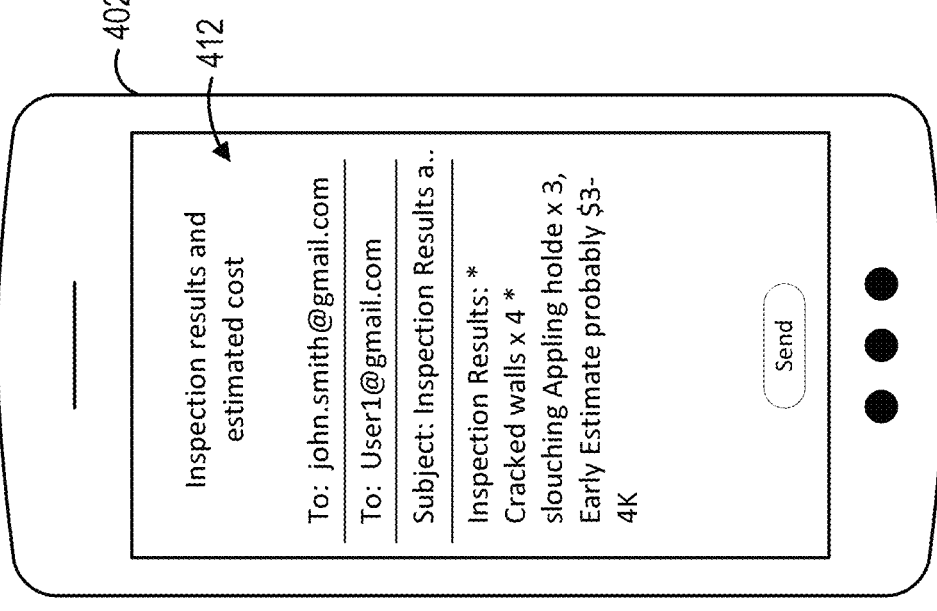
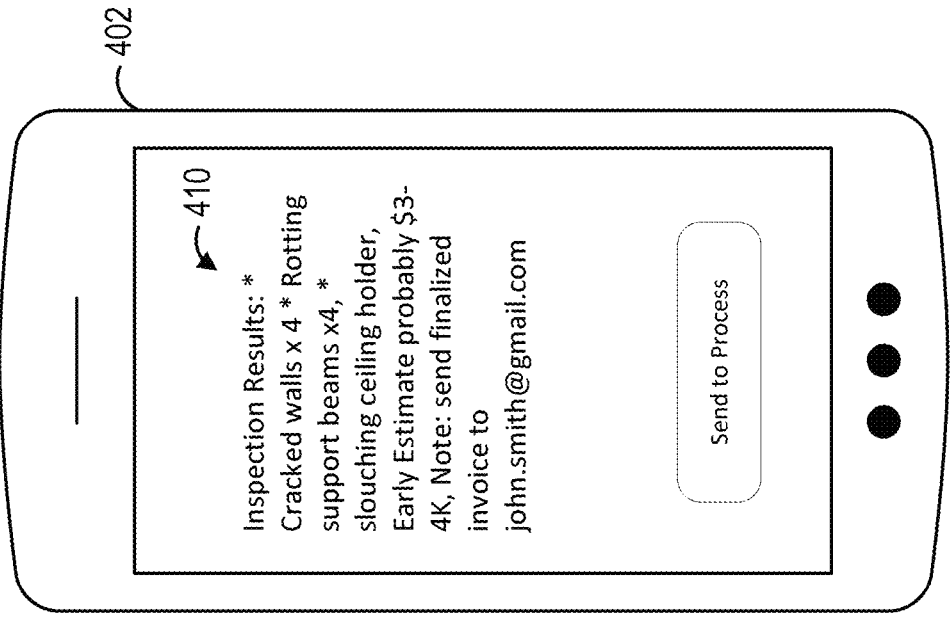
*FIG. 4B*

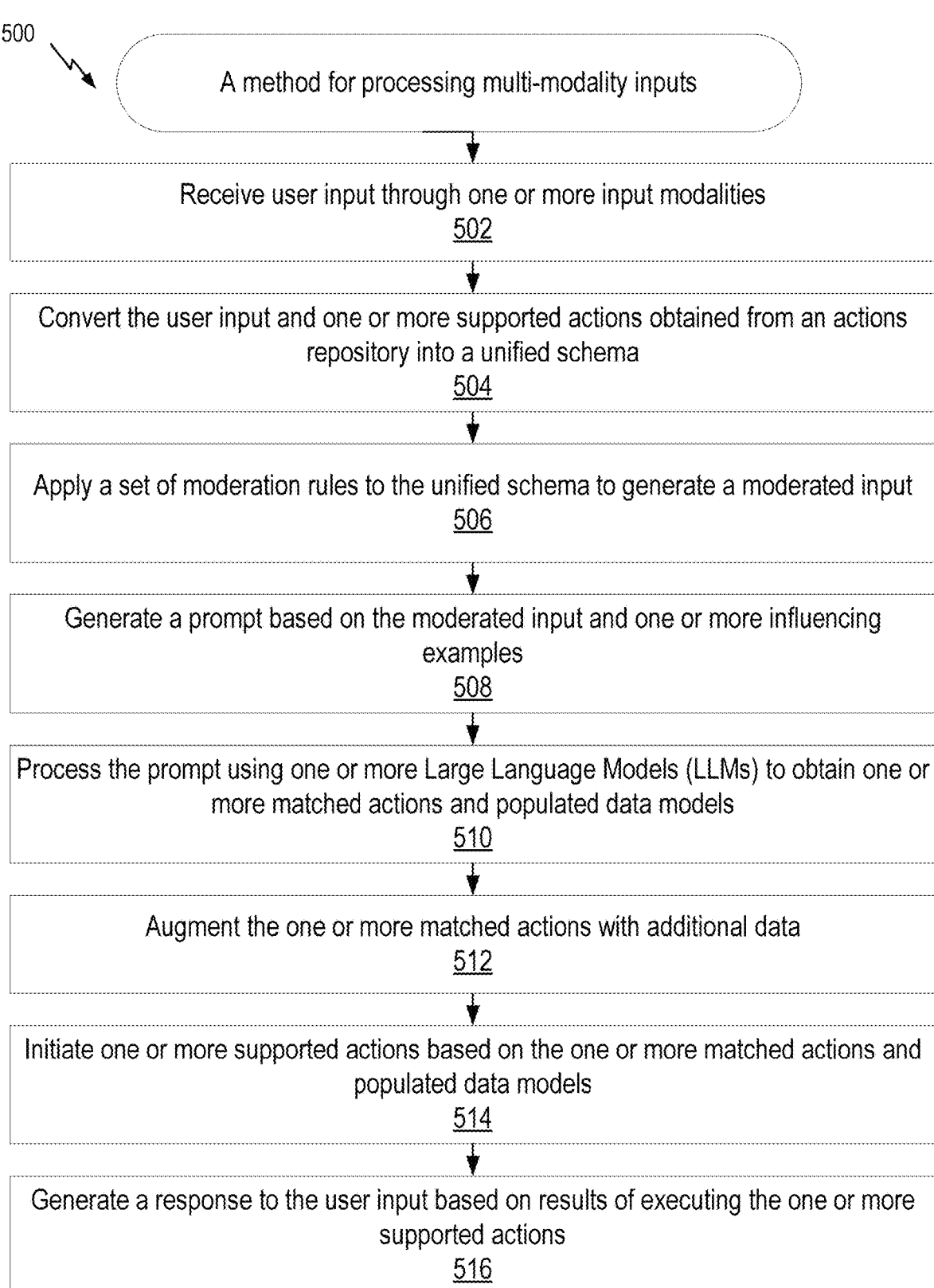

500

A method for processing multi-modality inputs

Receive user input through one or more input modalities
502

Convert the user input and one or more supported actions obtained from an actions repository into a unified schema
504

Apply a set of moderation rules to the unified schema to generate a moderated input
506

Generate a prompt based on the moderated input and one or more influencing examples
508

Process the prompt using one or more Large Language Models (LLMs) to obtain one or more matched actions and populated data models
510

Augment the one or more matched actions with additional data
512

Initiate one or more supported actions based on the one or more matched actions and populated data models
514

Generate a response to the user input based on results of executing the one or more supported actions
516

*FIG. 5*

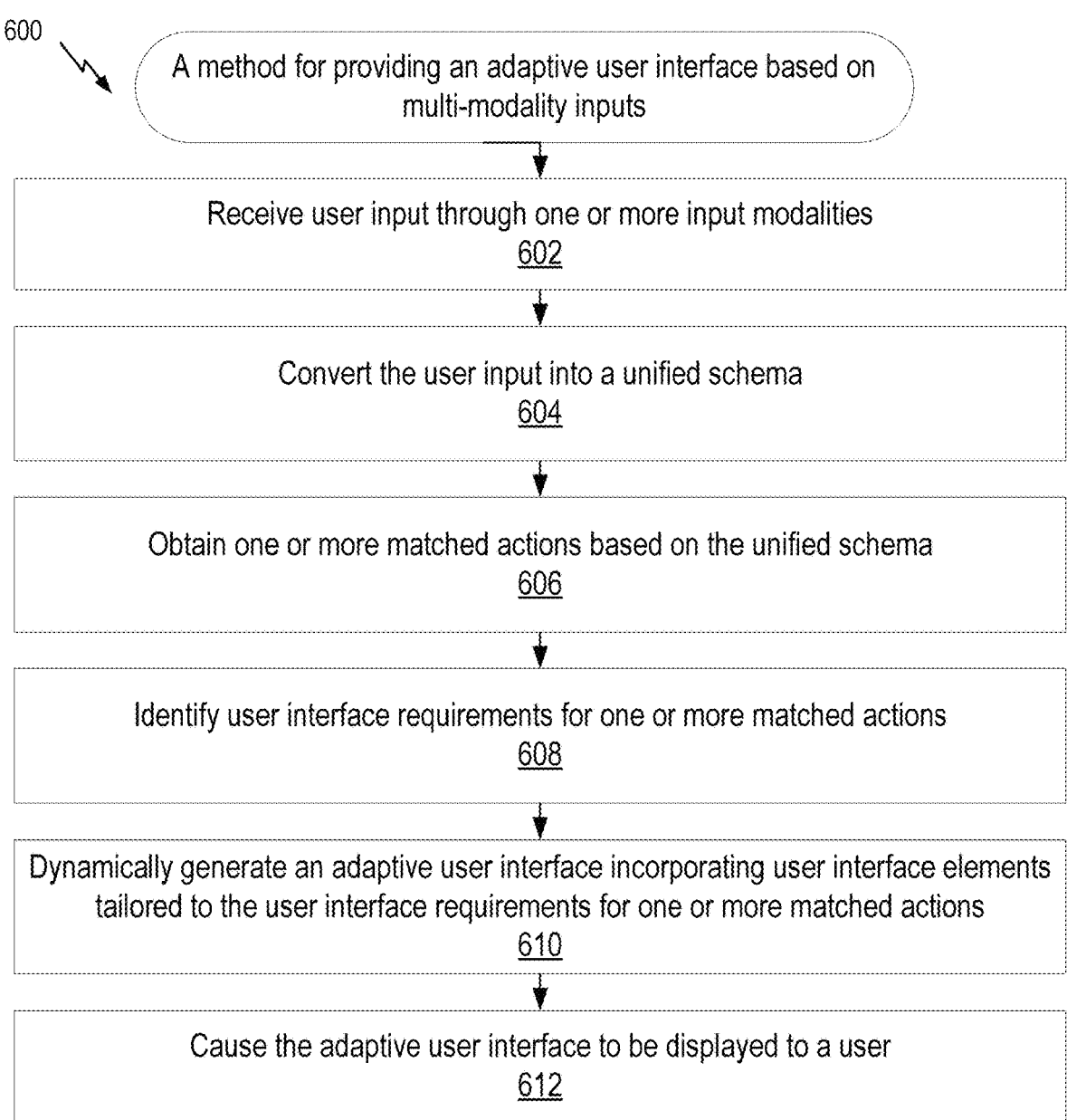

600

A method for providing an adaptive user interface based on multi-modality inputs Receive user input through one or more input modalities
602

Convert the user input into a unified schema
604

Obtain one or more matched actions based on the unified schema
606

Identify user interface requirements for one or more matched actions
608

Dynamically generate an adaptive user interface incorporating user interface elements tailored to the user interface requirements for one or more matched actions
610

Cause the adaptive user interface to be displayed to a user
612

Processor(s) 702

Input/Output Device(s) 704

Display Device(s) 706

Network Interface(s) 708

Bus 710

Computer-Readable Medium 712

Receiving Component 714

Converting Component 716

Applying Component 718

Generating Component 720

Processing Component 722

Augmenting Component 724

Initiating Component 726

Obtaining Component 728

Causing Component 730

Module Data 732

Schema Data 734

Action(s) Data 736

ORCHESTRATING DYNAMIC ACTIONS THROUGH MULTI-MODALITY INPUTS

BACKGROUND

Field

Aspects of the present disclosure relate to processing multi-modality inputs and providing adaptive user interfaces.

Description of Related Art

With the advancement of technology, users interact with computing systems through various input modalities, such as voice, image, and text. These multi-modality inputs provide a natural and intuitive way for users to express their intents and requests. However, processing these diverse inputs and triggering appropriate actions based on the user's intent remains a challenging task. Conventional systems often handle different input modalities separately, using specialized modules or algorithms for each modality. This approach leads to a fragmented and inefficient processing pipeline, as the systems need to maintain separate logic for understanding and acting upon user inputs in different formats. Moreover, these systems lack the ability to seamlessly combine and interpret information from multiple modalities, limiting their understanding of the user's overall intent.

Another challenge lies in mapping the user's intent to relevant actions or tasks. Traditional systems rely on pre-defined rules or hard-coded mappings to determine the appropriate actions based on user inputs. However, this approach tends to be inflexible and often fails to adapt to the diverse and evolving needs of users. Such an approach may require significant manual effort to define and maintain the rules, and the system's behavior is limited to the predefined set of actions.

Furthermore, existing systems often provide a one-size-fits-all user interface for displaying the results or guiding the user through the triggered actions. These static interfaces fail to consider the specific requirements and context of each action, leading to a suboptimal user experience. Users may find the interfaces cluttered, confusing, or lacking the necessary elements to effectively interact with the system and complete their desired tasks.

SUMMARY

Certain aspects provide a method for processing multi-modality inputs to trigger dynamic actions. In some aspects, the method comprises: receiving user input through one or more input modalities, wherein the input modalities include at least one of voice, image, or text; converting the user input and one or more supported actions obtained from an actions repository into a unified schema, wherein the unified schema represents the user input and the one or more supported actions in a standardized format; applying a set of moderation rules to the unified schema to generate a moderated input, including: filtering irrelevant or unnecessary information from the unified schema; and constraining the unified schema to adhere to specific formatting or structural requirements; generating a prompt based on the moderated input and one or more influencing examples; processing the prompt using one or more Large Language Models (LLMs) to obtain one or more matched actions and populated data models, wherein the one or more matched actions represents a mapping between the user input and the one or more supported actions; augmenting the one or more matched actions with additional data, wherein the additional data provides context for executing the one or more matched actions; initiating one or more supported actions based on the one or more matched actions and populated data models; and generating a response to the user input based on results of executing the one or more supported actions.

Certain aspects provide a method for providing an adaptive user interface based on multi-modality inputs. In some aspects, the method comprises: receiving user input through one or more input modalities; converting the user input into a unified schema; obtaining one or more matched actions based on the unified schema; identifying user interface requirements for one or more matched actions; dynamically generating an adaptive user interface incorporating user interface elements tailored to the user interface requirements for one or more matched actions; and causing the adaptive user interface to be displayed to a user, wherein the user interface elements are configured to facilitate user interaction and execution of the one or more matched actions.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 3 depicts additional details of the module registry and its interaction with actions and user interface elements according to examples of the present disclosure.

FIG. 4A illustrates an example user interface for selecting an image associated with an action according to examples of the present disclosure.

FIG. 4B illustrates an example user interface for displaying processed data and a selected adaptive user interface populated with the processed data in accordance with aspects of the present disclosure.

FIG. 5 depicts an example method for processing multi-modality inputs according to examples of the present disclosure.

FIG. 6 depicts an example method for providing an adaptive user interface based on multi-modality inputs according to examples of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
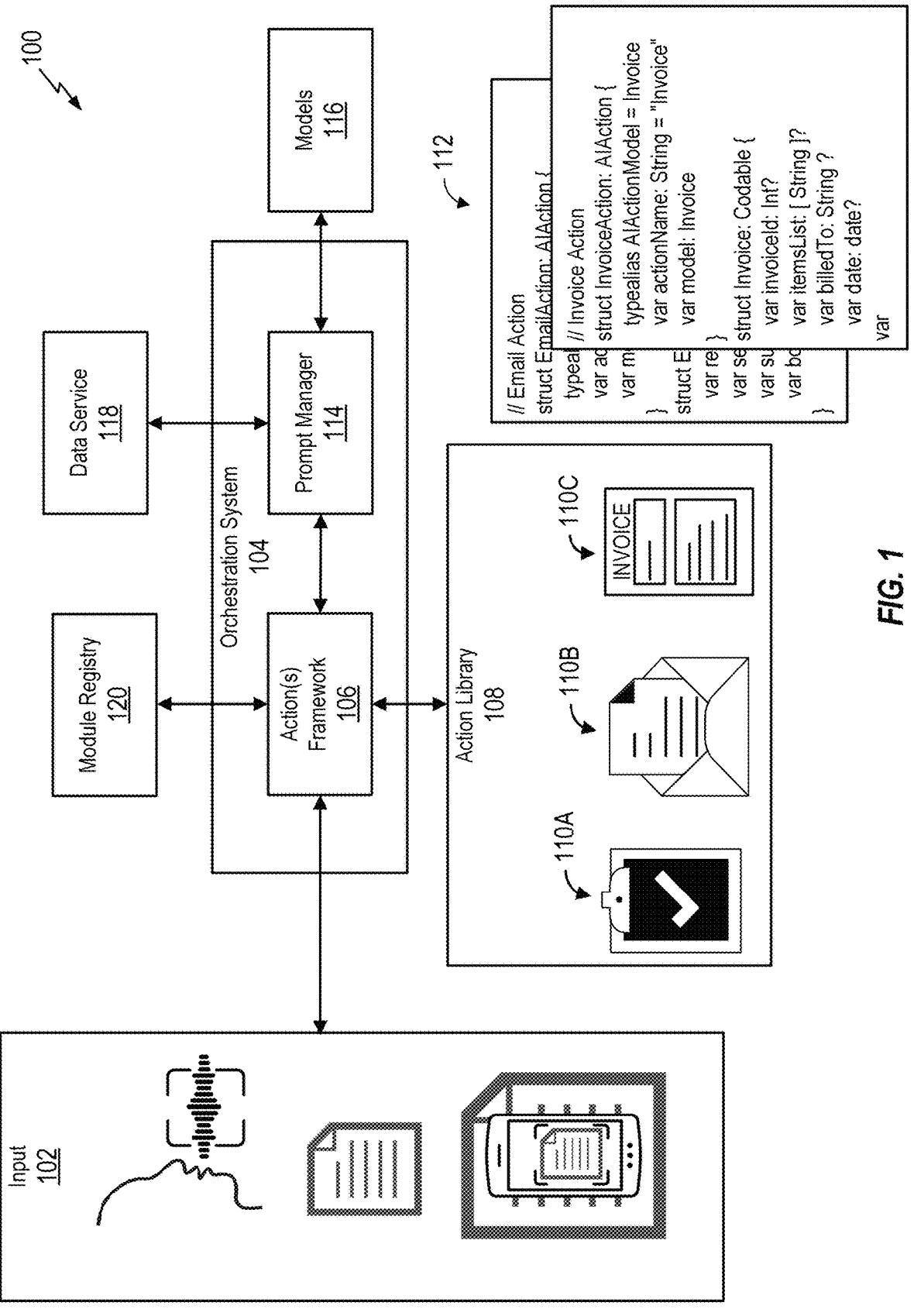
FIG. 1 depicts a system for processing multi-modality user inputs to dynamically trigger and orchestrate a series of actions according to examples of the present disclosure.

Aspects of the present disclosure provide apparatuses, methods, processing systems, and computer-readable mediums for processing multi-modality inputs and providing adaptive user interfaces based on the processed inputs.

The present disclosure describes a system and method for processing user inputs received through various modalities, such as voice, image, and text, and triggering dynamic actions based on the user's intent. The system employs a unified schema to represent the user inputs and supported actions in a standardized format, enabling seamless integration and interpretation of information from multiple modalities. By leveraging LLMs and a moderated prompt generation process, the system accurately maps the user's intent to relevant actions and generates adaptive user interfaces tailored to the specific requirements of each action.

One technical problem addressed by the present disclosure is the inefficient and fragmented processing of multi-modality inputs in conventional systems. These systems often handle different input modalities separately, leading to a lack of seamless integration and limited understanding of the user's overall intent. Another technical problem lies in the inflexible mapping of user intents to predefined actions, which fails to adapt to the diverse and evolving needs of users. Furthermore, existing systems often provide static, one-size-fits-all user interfaces that do not consider the specific context and requirements of each triggered action, resulting in a suboptimal user experience.

To address these technical problems, the present disclosure introduces a unified schema that standardizes the representation of user inputs and supported actions. By converting multi-modality inputs into this unified schema, the system enables efficient and consistent processing of user intents across different modalities. In some examples, the system applies moderation rules and incorporates influencing examples to generate high-quality prompts for LLMs, ensuring accurate mapping of user intents to relevant actions. The matched actions are further augmented with additional context and data, enabling the system to execute them effectively. Moreover, the present disclosure introduces adaptive user interfaces that dynamically adjust their elements and layout based on the specific requirements of each triggered action, providing a tailored and intuitive user experience.

The technical solutions provided by the present disclosure offer several benefits and advantages. By processing multi-modality inputs through a unified schema, the system achieves efficient and seamless integration of information, leading to a more accurate understanding of the user's intent. The moderated prompt generation process and the use of LLMs enable the system to accurately map user intents to relevant actions, adapting to the diverse and evolving needs of users. The augmentation of matched actions with additional context ensures their effective execution, enhancing the system's ability to handle complex tasks. Furthermore, the adaptive user interfaces provide a personalized and intuitive user experience, improving user engagement and satisfaction. By dynamically adjusting the interface elements based on the specific requirements of each action, the system reduces cognitive load and enables users to interact with the system more effectively, ultimately leading to increased productivity and efficiency.

Example System for Processing Multi-Modality User Inputs

FIG. 1 depicts a system 100 for processing multi-modality user inputs to dynamically trigger and orchestrate a series of actions according to examples of the present disclosure. In some aspects, the system 100 may include an input component 102, an orchestration system 104, an action(s) framework 106, an action library 108 containing actions such as a first action (e.g., task action) 110A, a second action (e.g., email action) 110B, a third action (e.g., invoicing) 110C, and example action configurations 112, a prompt manager 114, models 116, a data service 118, and a module registry 120.

The input component 102 is configured to receive input, such as user input, through various modalities such as voice, image, or text. In some aspects, the input component 102 preprocesses the received input and provides it to the orchestration system 104 for further processing. The orchestration system 104 may interpret the input received from the input component 102, determine one or more appropriate actions, and initiate/execute the one or more actions. Upon receiving input from a user, the orchestration system 104 converts the input and one or more supported actions into a unified schema. In some aspects, the unified schema may be a standardized format that represents the user input and supported actions in a consistent and structured manner, allowing for the integration and processing of data across different components of the system. A supported action refers to a predefined action that the system 100 is capable of performing in response to user input and based on the client's configuration. Supported actions are defined and managed using the action(s) framework 106 and stored in the action library 108. The action library 108 contains various predefined actions, such as a first action (e.g., task action) 110A for creating and managing tasks, a second action (e.g., email action) 110B for composing and sending emails, and a third action (e.g., invoicing) 110C for generating and processing invoices. Clients, such as service providers, have the flexibility to customize and extend the supported actions based on their specific requirements and use cases. They can configure one or more actions, often originating from an action template, with specific configuration content tailored to a user, application, device, or other relevant factors. The example action configurations 112 serve as templates or guidelines for creating new actions or customizing existing ones.

Each supported action may have its own unique data type and model, specifying the input fields, parameters, and behavior associated with that action. The data model may be different from the unified schema discussed earlier. While the unified schema may provide a standardized format for representing user input and supported actions, the data model can define the structure and format of the data for the action to be executed successfully. For instance, a "create task" action 110A may have a data model that includes fields such as task name, description, due date, assignee, and priority, while a "send email" action 110B may have fields like recipient, subject, body, and attachments. The data model may be specific to each action and may determine the input fields and parameters necessary for that action to function properly. The supported actions, with their respective data models, enable the system 100 to provide a flexible and extensible framework for handling a wide range of tasks and operations, allowing clients to define and customize the actions based on their specific domain and requirements. By leveraging supported actions, the system 100 can accurately interpret user input, map it to relevant actions, and execute those actions, providing a more natural and efficient interaction between users and the system.

The action library 108 is configured to store a collection of defined actions, each with its specific data model. As each action may be constructed or defined to accomplish a specific goal or objective, adding additional actions to the action library 108 extends the action library 108 based on specific requirements and use cases. Thus, the ability to add additional actions to the action library 108 enables the system 100 to handle diverse tasks and operations by expanding the range of available actions. The action(s) framework 106 an provide tools and infrastructure to define, manage, and integrate new actions into the action library 108, ensuring that the system 100 can accommodate evolving requirements and support a wide variety of use cases.

When a user provides input through one of the supported modalities (voice, image, or text), the orchestration system 104 converts the input into a unified schema. This unified schema represents the user's intent and the relevant information extracted from the input. The unified schema refers to a structured representation of data that defines the properties, relationships, and constraints of the data elements involved in the processing of user input and the execution of actions. The schema provides a standardized format for representing and interpreting the user's intent, the relevant information extracted from the input, and the structure and behavior of the supported actions.

The process of converting the user input and actions into a unified schema involves analyzing the user input received from the input component 102 and transforming it into a structured format that can be effectively processed by the system 100. A unified schema serves as a common language or interface between the various components of the system 100, helping to ensure that the data is consistently interpreted and handled throughout processing. The unified schema for user input may include elements such as the input modality (e.g., audio, video, image, or text), the raw input data (e.g., the spoken words, the image file, or the text string), and any additional metadata or contextual information associated with the input. In examples, the orchestration system 104 extracts the relevant information from the user input and organizes it into a structured format defined by the unified schema.

Similarly, the supported actions may also be converted into a schema representation, which may be part of the overall unified schema. Each supported action has its own unique data type and model, specifying the input fields, parameters, and behavior associated with that action. The action schema defines the structure and format of the data for the action to be executed successfully. It includes elements such as the action name, input parameters, output format, and any additional metadata or constraints associated with the action. The action schemas may be integrated into the unified schema, which encompasses both the user input and the supported actions. The action(s) framework 106 and the action library 108 define and manage the schemas for the supported actions. The action(s) framework 106 provides a structured approach for creating and managing action schemas, allowing clients to define the data models and specify the required and optional fields for each action. The action library 108 serves as a repository for storing the predefined action schemas, making them available for use by the orchestration system 104. By converting both the user input and the supported actions into a unified schema, the orchestration system 104 enables the integration and processing of data across the different components of the system 100. That is, the schema acts as a contract or agreement between the various modules, ensuring that the data is consistently interpreted and handled throughout the processing pipeline.

In examples, the use of schemas provides several benefits to the system 100. Schemas allow for the standardization and validation of data, ensuring that the user input and the supported actions conform to the expected structure and format. Schemas also enable the system to perform efficient data manipulation, querying, and transformation operations, as the data is organized in a structured manner. Moreover, the use of schemas facilitates the extensibility and adaptability of the system. As new input modalities, data sources, or actions are introduced, their corresponding schemas can be defined and integrated into the system 100 without disrupting existing processing pipelines. This allows for the seamless addition of new functionalities and the accommodation of evolving requirements.

The prompt manager 114 generates prompts with examples of supported actions to guide the LLMs in providing accurate and relevant results. The models 116 analyze the schematized data and match it with the action schemas defined in the action library 108. This process involves identifying the user's intent, extracting relevant entities and parameters from the input, and mapping them to the corresponding fields in the action data models. The result of this matching process is a set of matched actions. A matched action represents an action that has been determined to be relevant and applicable based on the user's input. In some examples, the matched action includes the action itself (e.g., "create task" 110A or "send email" 110B) along with a populated data model. The populated data model contains the specific values and parameters extracted from the user's input, mapped to the appropriate fields of the action's data model. For example, if the user says, "Create a task to submit the monthly report by next Friday," the models 116 would match this input to the "create task" action 110A. The populated data model for this matched action would include the task name ("submit the monthly report") and the due date ("next Friday"). The orchestration system 104 then uses this matched action and its populated data model to execute the corresponding task creation operation.

In cases where additional information is needed to complete a matched action, the data service 118 fetches the data from external sources. This ensures that the matched action has the context and data to be executed successfully. Once the matched actions are determined and their data models are populated, the orchestration system 104 can send one or more callbacks to client applications to handle the execution of these actions. Callbacks, in this context, may refer to a mechanism where the orchestration system 104 notifies or prompts the client applications to execute specific actions based on the matched actions and their associated data. The callbacks can provide a way for the orchestration system 104 to communicate with the client applications and trigger the appropriate actions or processes. The client applications, upon receiving the callbacks, can then initiate the execution of the matched actions using their own specific implementations or APIs. The module registry 120 can dynamically determine an appropriate user experience to launch based on the context of each matched action, providing a tailored and intuitive interface for the user to interact with.

Figure 2A:
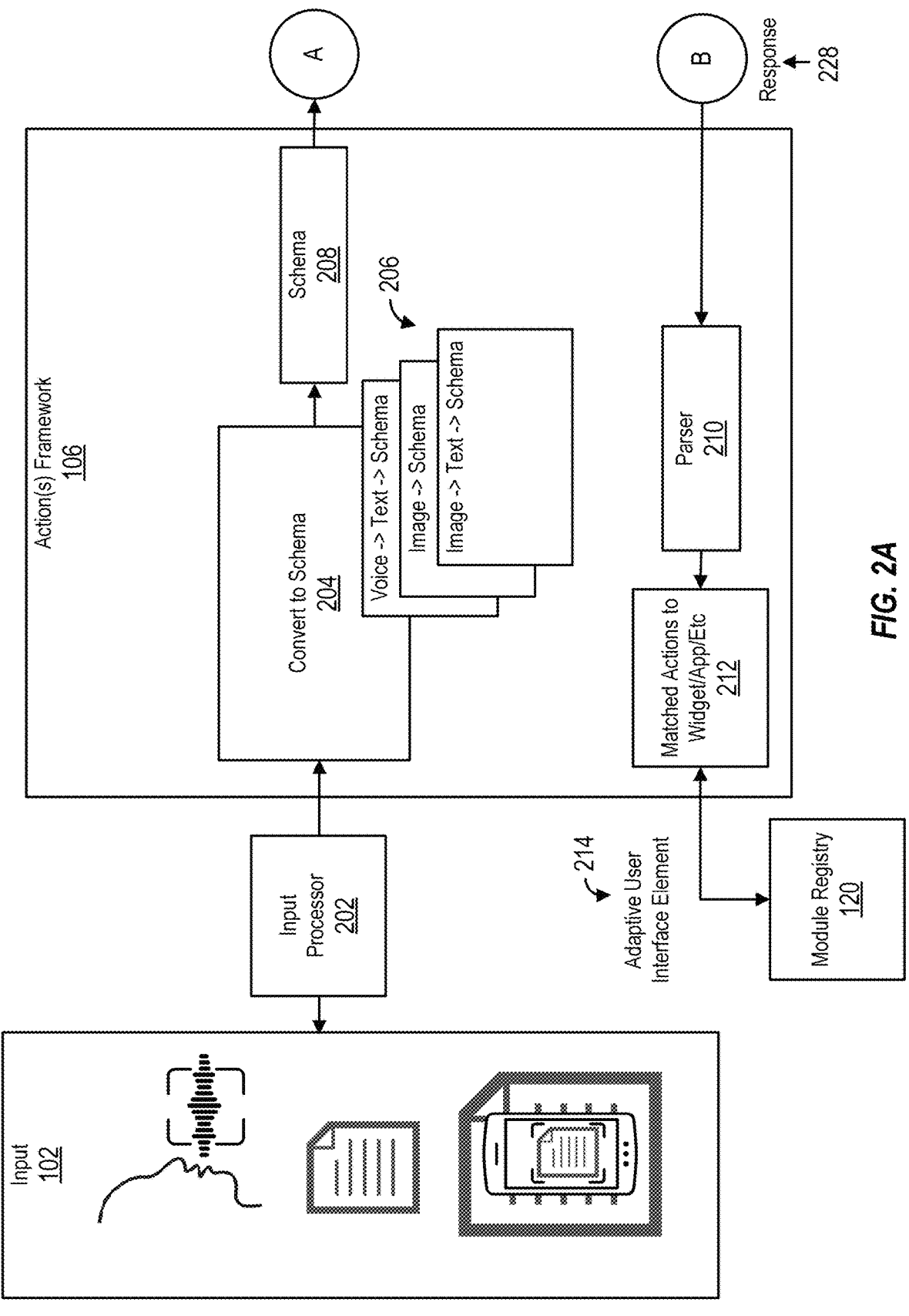
FIG. 2A depicts additional details directed to input processing and action matching components of the system according to examples of the present disclosure.

FIG. 2A depicts additional details directed to input processing and action matching components of the system 100 according to examples of the present disclosure. In examples, the input processor 202 receives user input in various modalities such as voice, image, or text. The input processor 202 preprocesses the input and provides the preprocessed input to the action(s) framework 106 for conversion into a unified schema representation along with the supported actions obtained from the action library 108. That is, the schema block 204 may transform the user input into the unified schema representation 206. This conversion process can vary depending on the input modality. For example, for voice input, the schema block 204 may utilize a transcription (cither provided by a device, the input processor 202, or provided by the action(s) framework 106). It then maps textual data from the transcription to the schema. For image input, one or more computer vision algorithms may extract relevant information from the image and structure it according to the schema. If the image contains text, then optical character recognition (OCR) techniques may be applied to convert the image into text before mapping it to the schema. The schema block 204 ensures that the user's intent and relevant information are captured in a standardized format.

In examples, the unified schema representation is a standardized format that encapsulates the user's intent, relevant entities, and parameters extracted from the input. It serves as a common representation that can be understood and processed by subsequent components of the system 100. The unified schema 208 can be configured to be flexible and extensible, allowing for the incorporation of various data fields and structures used by different actions and use cases. The unified schema 208 can then be provided to the prompt manager 114 (shown in FIG. 2B), which generates a prompt based on the unified schema 208 and sends it to the models 116 for processing. The models 116, which include LLMs, analyze the prompt and generate a response 228 containing the matched actions 212 and populated data models, as will be described with reference to FIG. 2B. The response 228 may be received by the parser 210. In certain aspects, the parser 210 extracts the matched actions 212 and their corresponding populated data models from the response 228. The matched actions 212 represent the actions that are most relevant to the user's intent based on the information provided in the unified schema 208. Each matched action includes the specific action to be performed (e.g., create a task, send an email) along with the parameters and data for its execution.

In examples, the parser 210 converts the matched actions 212 and their populated data models into a format that can be understood and executed by the system 100. The parser 210 orchestrates the series of actions for all the foundational widgets, apps, and the like, such as one or more widgets or apps for creating an invoice, drafting an email, creating a task, etc. The parser 210 may also perform data validation and error handling to ensure the integrity and consistency of the matched actions 212. Based on the matched actions 212 received from the parser 210, the action(s) framework 106 may determine one or more adaptive user interface elements 214 to be provided to the corresponding widgets, apps, or other components. For example, the action(s) framework 106 can provide a callback to a module registry 120 of the application initiating the action. The module registry 120 maintains a mapping between different actions and their corresponding user interface requirements and/or user interface elements. The module registry 120 can determine one or more user interface components (e.g., adaptive user interface elements 214) to be included in the adaptive user interface element 214.

In examples, the adaptive user interface element 214 dynamically adapts its layout and components based on the specific requirements and context of the matched actions 212. The adaptive user interface element 214 provides an intuitive and user-friendly interface for the user to interact with and confirm or modify the actions before they are executed. Once a user interacts with the adaptive user interface element 214 and confirms the actions, the system 100 proceeds to execute the matched actions 212. The action(s) framework 106 coordinates the execution process by invoking the appropriate functions or APIs associated with each action. The action(s) framework 106 may also handle any data validation or error handling during the execution phase.

Throughout the process, the system 100 maintains a feedback loop with the user, providing updates on the progress of the actions and allowing for modifications or cancellations. The adaptive user interface element 214 may display status messages, confirmation prompts, or error notifications to keep the user informed about the execution of the matched actions 212.

Figure 2B:
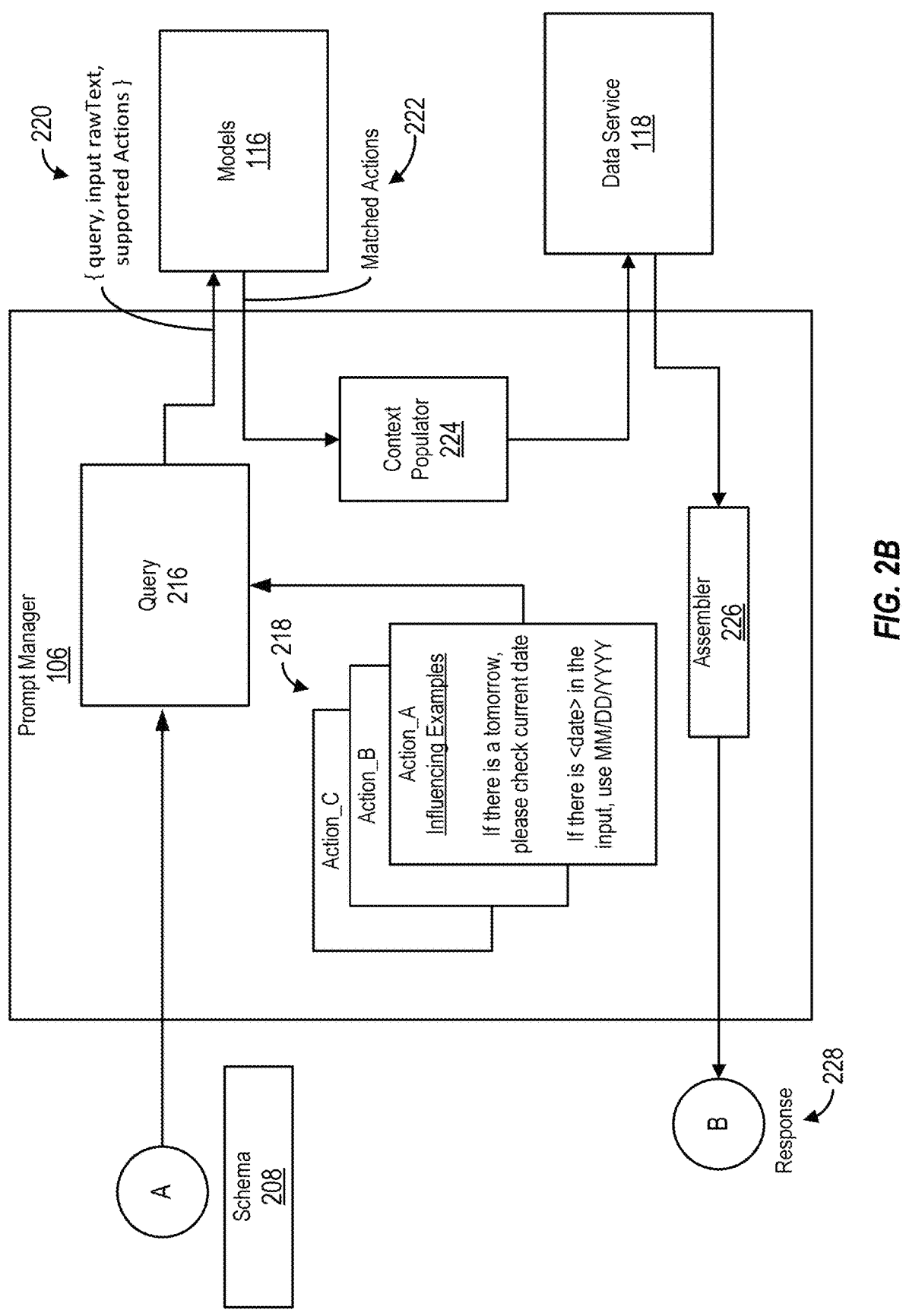
FIG. 2B depicts details of the prompt generation and response processing components of the system according to aspects of the present disclosure.

The response 228, which is generated by the prompt manager 114 and models 116 in FIG. 2B, provides the matched actions 212 and their associated data models to the parser 210. The process of generating the response 228 involves the prompt manager 114 applying moderation rules, generating influencing examples, and sending the prompt to the models 116 for analysis. The detailed description of the response generation process will be provided in the context of FIG. 2B.

FIG. 2B depicts details of the prompt generation and response processing components of the system 100 according to aspects of the present disclosure. In examples, the prompt manager 114 receives the unified schema 208 from the input processor 202 (shown in FIG. 2A) and generates a prompt 216 based on the information contained in the unified schema 208. The prompt 216 is then sent to the models 116 for analysis and generation of matched actions 222.

The prompt manager 114 is responsible for generating the prompt 216 based on the unified schema 208. The prompt manager applies a set of moderation rules to the prompt 216, which may be generated from the unified schema 208, to filter out any irrelevant or unnecessary information. The moderation rules ensure that the prompt 216 focuses on the essential aspects of the user's intent and requirements. By applying these rules, the prompt manager 114 refines the prompt 216 to improve its clarity and relevance. In addition to the moderation rules, the prompt manager 114 also incorporates one or more influencing examples 218 into the prompt 216. The influencing examples 218 are examples or templates that guide the models 116 in generating more accurate and relevant matched actions 222. These examples provide context and structure to the prompt 216, helping the models 116 understand the desired format and content of the response.

The influencing examples 218 may be generated to cover a wide range of possible user intents and requirements. That is, the influencing examples 218 can be designed to capture common patterns, structures, and formats that are typically associated with different types of actions. For example, if the user's intent is to create a task, the influencing examples 218 may include templates for task creation, such as specifying the task name, description, due date, and assignee. The influencing examples 218 also influence how variations in user input are handled. They work to reduce ambiguity based on the user input. For example, the influencing examples 218 provide guidance on how to interpret and process different phrasings, synonyms, or contextual cues that users may use to express their intent. By incorporating these variations into the influencing examples 218, the system 100 can better understand and respond to a wide range of user inputs.

Another aspect of the influencing examples 218 is their ability to handle specific data formats and structures. For instance, if the user's input contains a date or time, the influencing examples 218 can provide guidance on how to extract and format the date information consistently. This ensures that the matched actions 222 generated by the models 116 have the correct data format and structure for execution. The influencing examples 218 are not limited to textual templates alone. They can also include other types of data, such as images, audio, or video, depending on the nature of the user input and the supported actions. For example, if the user's input is an image, the influencing examples 218 may include sample images or image processing techniques to guide the models 116 in extracting relevant information from the image.

The influencing examples 218 can be dynamically selected and incorporated into the prompt 216 based on the specific characteristics of the user's input and the supported actions. The prompt manager 114 can analyze the unified schema 208 and match it with one or more relevant influencing examples 218. This dynamic selection process ensures that the prompt 216 is tailored to the specific user input and increases the likelihood of generating accurate and relevant matched actions 222.

In some examples, the influencing examples 218 may be updated and refined based on feedback and learning from user interactions. As the system 100 processes more user inputs and generates matched actions 222, the system can learn from the outcomes and adjust the influencing examples 218 accordingly. This iterative learning process allows the system to improve its understanding of user intents and preferences over time, leading to more accurate and personalized responses. Thus, by incorporating the influencing examples 218 into the prompt manager 114, the system 100 can effectively guide the models 116 in generating accurate and contextually relevant matched actions 222.

Examples of influence examples 218 may include, but are not limited to: (1) Time formatting example: if the input contains a time reference like "3 pm" or "9:30 am", return the time in 24-hour format "HH:MM". For example, if the input is "set an alarm for 7:30 am", the returned time should be "07:30"; (2) Phone number formatting example: if the input contains a phone number in various formats like "(555) 123-4567" or "555.123.4567", standardize the format to "XXX-XXX-XXXX". For example, if the input is "call John at 555.123.4567", the returned phone number should be "555-123-4567"; (3) Currency formatting example: if the input contains a monetary value like "$1,234.56" or "5000", return the value in the format "$X,XXX.XX". For example, if the input is "the total cost is $1234.5", the returned currency should be "$1,234.50"; (4) URL formatting example: if the input contains a URL without a protocol, add "https://" at the beginning. For example, if the input is "check out example.com for more information", the returned URL should be "https://example.com"; and (5) Percentage formatting example: if the input contains a percentage value like "50%" or "0.75", return the value in decimal format. For example, if the input is "the success rate is 75%", the returned percentage should be "0.75". Of course, other influencing examples, including formatting of such influencing examples, may be used.

The prompt 216 generated by the prompt manager 114 includes the example prompt 220. The example prompt 220 is a specific instance of the prompt 216 that incorporates the influencing examples 218. The example prompt 220 serves as a concrete representation of the type of response expected from the models 116.

The models 116 receive the prompt 216, including the example prompt 220, from the prompt manager 114. The models 116 may include one or more machine learning models, such as LLMs, that analyze the prompt 216 and generate the matched actions 222 based on the information provided. As previously described, the matched actions 222 represent the actions that are most relevant to the user's intent and requirements, as determined by the models 116. Each matched action includes the specific action to be performed (e.g., create a task, send an email) along with the parameters and data for its execution. The models 116 populate the data models associated with each matched action based on the information extracted from the unified schema 208 and the influencing examples 218.

The models 116 may be implemented using one or more machine learning techniques, such as LLMs or other natural language processing (NLP) algorithms. A function of the models 116 is to understand the user's intent and map it to the appropriate actions based on the information provided in the prompt 216. The models 116 receive the prompt 216, which includes the example prompt 220 and the influencing examples 218, as input. The models 116 process the prompt 216 by analyzing its content and structure. In examples, the models 116 may employ various NLP techniques, such as tokenization, named entity recognition, and semantic analysis, to extract meaningful information from the input. The models 116 aim to identify the key entities, intents, and parameters that are relevant to the user's request.

The matched actions 222 are generated based on the information extracted from the prompt 216 and the knowledge encoded within the models 116. Once the models 116 have analyzed the prompt 216, the models 116 can generate the matched actions 222. The matched actions 222 represent the actions that are most relevant to the user's intent and requirements, as determined by the models 116. Each matched action corresponds to a specific task or operation that the system can perform to fulfill the user's request. The models 116 leverage their training data, which may include text and examples, to identify patterns, relationships, and associations between the user's input and the supported actions. For example, if the user's input is "Create a task to submit the monthly report by next Friday," the models 116 could analyze the input and identify the relevant entities and intents. In this case, the models 116 could recognize the intent as "create a task" and extract the relevant parameters such as the task description ("submit the monthly report") and the due date ("next Friday").

Based on this analysis, the models 116 may generate a matched action for creating a task. The matched action could include the specific action type (e.g., "CreateTask") along with the populated data model containing the extracted parameters. The populated data model may have one or more fields such as the task name, description, due date, and any other relevant information. The models 116 can generate multiple matched actions 222 for a single user input, depending on the complexity and ambiguity of the request. For example, if the user's input is "Schedule a meeting with John and send him the agenda," the models 116 might generate two matched actions: one for scheduling the meeting and another for sending the agenda.

Moreover, the matched actions 222 generated by the models 116 are not limited to a fixed set of predefined actions. The models 116 may have the flexibility to generate novel or customized actions based on the specific requirements of the user's input. This allows the system to handle a wide range of user requests and adapt to new or unique scenarios. Once the matched actions 222 are generated, they are passed to the context populator 224 for further enrichment and processing.

In some examples, the context populator 224 is responsible for enriching, or augmenting, the matched actions 222 with additional context and information. The context populator 224 identifies possible missing or incomplete information in the matched actions 222 and retrieves the missing information from the data service 118. The context populator 224 ensures that the matched actions 222 have the context and data to be executed successfully. The data service 118 represents an external component that provides additional data and context to the context populator 224. The data service 118 acts as a source of information, allowing the context populator 224 to retrieve relevant data based on the requirements of the matched actions 222. The data service 118 can be implemented as a database, an API, or any other data storage and retrieval mechanism. The assembler 226 receives the enriched matched actions 222 from the context populator 224 and combines them with the populated data models to create a comprehensive response 228. The assembler 226 structures the response 228 in a format that can be easily parsed and understood by the parser 210 (shown in FIG. 2A).

The response 228 represents the final output of the prompt manager 114 and models 116. It contains the matched actions 222 along with their associated data models, enriched with additional context and information. The response 228 is sent back to the parser 210 in FIG. 2A for further processing and execution of the matched actions 222.

FIG. 3 depicts additional details of the module registry 120 and its interaction with actions and user interface elements according to examples of the present disclosure. The module registry 120 can act as a central repository that maintains a mapping between actions and their corresponding user interface requirements and/or one or more adaptive user interface elements. That is, the module registry 120 can enable the system to dynamically determine the appropriate user interface elements to be presented to the user based on the specific actions being executed.

In examples, the module registry 120 includes a collection of actions 302A-302N. Each action represents a specific task or operation that the system can perform in response to user input. For example, action 302A might represent the task of creating a new calendar event, while action 302B might represent the task of sending an email. The actions 302A-302N may be defined and configured based on the specific requirements and capabilities of the system. Each action in the module registry 120 may be associated with a corresponding user interface element. The user interface elements 304A-304N represent the visual components and interactions that may be needed to facilitate user input and display the results of the actions. These user interface elements are designed to provide an intuitive and user-friendly experience for interacting with the system.

The user interface elements 304A-304N can be adaptive and dynamically generated based on the specifics of each action. The user interface elements 304A-304N can be tailored to the unique characteristics and data models of the corresponding actions. For example, if action 302A represents creating a new calendar event, its associated user interface element 304A could include input fields for specifying the event title, date, time, location, and other relevant details. Similarly, if action 302B represents sending an email, its associated user interface element 304B could include input fields for specifying the recipient, subject, and body of the email.

The user interface elements 304A-304N can be customized and extended to accommodate new actions or modifications to existing actions. In some examples, the user interface elements 304A-304N may be reusable and modular. This modularity allows for a flexible and scalable system that can adapt to changing requirements and user needs. In addition to the visual components, the user interface elements 304A-304N may incorporate validation and error handling mechanisms to ensure that user inputs are properly validated and that appropriate feedback is provided to the user in case of errors or invalid data.

In some examples, the module registry 120 may support versioning and backward compatibility for the actions 302A-302N and their associated user interface elements 304A-304N. As the system 100 evolves and new versions of actions are introduced, the module registry 120 can maintain a history of previous versions and ensure that existing user interfaces remain compatible with the updated actions.

Example User Interfaces for Providing Multi-Modal User Input and Action Processing FIG. 4A illustrates an example user interface for selecting an image associated with an action according to examples of the present disclosure. The user interface can be displayed on a device 402, which can be any computing device capable of running one or more aspects of the system 100 (FIG. 1), such as a smartphone, tablet, laptop, or desktop computer. The user interface provides an intuitive and interactive way for the user to select an image that represents a specific action, such as generating an email based on inspection results.

As depicted in FIG. 4A, the device 402 displays the user interface, which includes an example image 404. In this particular example, the image 404 represents an invoice. The example image 404 can be presented to the user to provide context and guidance for selecting an appropriate image. The user interface also includes a selection of one or more images 406 that are associated with inspection results. These images are retrieved from a database or a defined collection of images that are relevant to the specific action. In addition to the selection of images 406, the user interface includes a prompt to choose another 408. This prompt serves as a reminder or suggestion for the user to consider alternative images if the currently selected image does not fully represent the intent associated with an image. The prompt to choose another 408 encourages the user to explore additional options and ensures that they have the flexibility to select an image that accurately reflects their specific request.

When the user interacts with the prompt to choose another 408, the user interface may display a new set of images or provide an option to search for specific images based on keywords or criteria. This allows the user to refine their selection and find an image that better aligns with the content and format of their inspection results. Once the user has selected an image and is satisfied with their choice, they can proceed to the next step. In examples, the selected image will be processed using optical character recognition (OCR)

techniques to extract the relevant inspection data, which will be used to determine and execute an action.

FIG. 4B illustrates an example user interface for displaying processed data and a selected adaptive user interface populated with the processed data in accordance with aspects of the present disclosure. The user interface can be displayed on the device 402. The device 402 displays the user interface, which includes the processed data 410. The processed data 410 represents the information that has been extracted and transformed from the user's selected image of inspection results. The processed data 410 may include text that has been obtained through optical character recognition (OCR) techniques applied to the selected inspection results image. The OCR process can analyze the selected image and extract any readable text present in the image. This text may include information such as the inspection date, inspector name, item descriptions, pass/fail status, and any additional notes or observations. The OCR process converts the image into machine-readable text, making it easier for the system to populate an adaptive user interface with the relevant inspection data.

The user interface may present the extracted text in a structured format, such as a list or table, to facilitate readability and comprehension. The processed data 410 may be categorized or grouped based on the type of information, such as inspection details, item results, or additional notes. The user can select the send to process button where an action can be determined (e.g., using system 100 FIG. 1) and an adaptive user interface may be returned containing data based on the processed data 410.

The adaptive user interface 412 represents a specific user interface layout and components that have been chosen based on the user's selection of the inspection results image and the system 100's (e.g., FIG. 1) determination of an email action. The adaptive user interface 412 may accommodate the processed data 410 and provide an intuitive way for the user to interact with and modify the email content.

The selected adaptive user interface 412 can be populated with the processed data 410, automatically filling in the relevant fields and sections of the email template. For example, the inspection date, inspector name, and item results extracted from the image will be inserted into the corresponding fields in the adaptive user interface. The adaptive user interface 412 can allow the user to modify or add information as needed. The user can interact with the populated fields, editing the text or adding new details that may not have been captured by the OCR process. The adaptive user interface 412 provides input controls, such as text fields, dropdown menus, or checkboxes, to facilitate data entry and modification. The user interface may also include validation and error handling mechanisms to ensure the accuracy and completeness of the populated data. For example, if the OCR process fails to extract certain information or if the extracted data is incomplete or inconsistent, the user interface may highlight the affected fields and prompt the user to manually input the missing details. This helps to maintain data integrity and ensures that the final email is accurate and reliable.

In addition to populating the adaptive user interface 412 with the processed data 410, the user interface may provide options for formatting and styling the email. The user may be able to adjust the layout, fonts, or colors to customize the visual appearance of the email according to their preferences or branding guidelines. These formatting options allow users to create professional-looking emails that align with their business identity.

Once the user has reviewed and modified the populated data in the adaptive user interface 412, they can proceed to finalize the email. The user interface may provide options to save, print, or send the email electronically. The system 100 can utilize a widget or app and generate the final email based on the populated data and any user modifications.

By presenting the processed data 410 and populating the selected adaptive user interface 412, the system 100 (FIG. 1) can identify an action based on user input, and streamline portions of the action to reduce manual data entry. For example, suppose a user captures an image of an inspection report using their mobile device. The system 100 (FIG. 1) receives the image as input and applies OCR technology to extract the relevant data, such as the inspection date, inspector name, and specific inspection findings. Based on this processed data, the system identifies that the user likely wants to generate an email to report the inspection results. The system then automatically populates the adaptive user interface with the extracted information, such as the email recipient, subject line, and body text, reducing the need for manual data entry. The user can review and modify the pre-populated email as needed before sending it out. The combination of OCR technology and adaptive user interfaces enables users to quickly and accurately generate content, such as emails, based on their selected inspection results images, saving time and effort while maintaining data accuracy and consistency.

Example Method for Processing Multi-Modality Inputs

FIG. 5 depicts an example method 500 for processing multi-modality inputs. In one aspect, method 500 can be implemented by the system 100 FIG. 1 and/or processing system 700 of FIG. 7.

Method 500 starts at block 502 with receiving user input through one or more input modalities. In some embodiments of method 500, the input modalities include at least one of voice, image, or text. In some aspects, block 502 corresponds to the functionality of the input component 102 described in FIG. 1, which receives user input through various modalities such as voice, image, or text.

Method 500 continues to block 504 with converting the user input and one or more supported actions obtained into an actions repository into a unified schema. In some embodiments of method 500, the unified schema represents the user input and the one or more supported actions in a standardized format. In some aspects, block 504 corresponds to the functionality of the orchestration system 104 and/or action(s) framework 106 described in FIG. 1 and FIG. 2A. In examples, the user input and supported actions obtained from the action library 108 may be converted into a unified schema representation by the schema block 204 of FIG. 2.

Method 500 continues with block 506 with applying a set of moderation rules to the unified schema to generate a moderated input. In some embodiments of method 500, block 506 may further include filtering irrelevant or unnecessary information from the unified schema and constraining the unified schema to adhere to specific formatting or structural requirements. In some aspects, block 506 corresponds to the functionality of the prompt manager 114 described in FIG. 2B, which may apply moderation rules to the unified schema 208 to generate a moderated input or prompt 216.

Method 500 continues with block 508 with generating a prompt based on the moderated input and one or more influencing examples. In some aspects, block 508 corresponds to the functionality of the prompt manager 114 and influencing examples 218 described in FIG. 2B, where the prompt 216 may be generated based on the moderated input and influencing examples.

Method 500 continues with block 510 with processing the prompt using one or more LLMs to obtain one or more matched actions and populated data models. In some embodiments of method 500, the one or more matched actions represents a mapping between the user input and the one or more supported actions. In some aspects, block 510 corresponds with the functionality of the models 116 described in FIG. 2B, which process the prompt 216 using models 116 to obtain matched actions 222 and populated data models.

Method 500 continues with block 512 with augmenting the one or more matched actions with additional data. In some embodiments of method 500, the additional data provides context for executing the one or more matched actions. In some aspects, block 512 corresponds to the functionality of the context populator 224 and data service 118 described in FIG. 2B, where the matched actions 222 are augmented with additional data to provide context for execution.

Method 500 continues with block 514 with initiating one or more supported actions based on the one or more matched actions and populated data models. In some aspects, block 514 corresponds to the functionality of the action(s) framework 106 and module registry 120 described in FIG. 1 and FIG. 3, which initiate the supported actions based on the matched actions and populated data models.

Method 500 ends at block 516 with generating a response to the user input based on results of executing the one or more supported actions. In some aspects, block 516 corresponds to generating a response 228 to the user input based on the results of executing the supported actions, as described in FIG. 2B.

In some embodiments of method 500, the one or more influencing examples includes at least one of: examples of desired response formats or structures; guidance on a tone, style, or level of formality to be used in the generated responses; or domain-specific terminology or conventions.

In some embodiments of method 500, generating the prompt based on the moderated input and the one or more influencing examples comprises: combining the moderated input and the one or more influencing examples into a single input format; and providing the combined moderated input to the one or more LLMs for processing.

In some embodiments of method 500, augmenting the one or more matched actions with additional data comprises: identifying missing or incomplete information in the one or more matched actions; and retrieving the missing or incomplete information from a data service.

In some embodiments of method 500, executing the one or more of the supported actions comprises executing the one or more of the supported actions through an adaptive user interface that dynamically adapts to specific requirements of a respective action of the one or more of the supported actions.

In some embodiments of method 500, the adaptive user interface comprises a set of reusable user interface components dynamically assembled based on requirements of each action.

In some embodiments of method 500, generating the response to the user input comprises presenting the response using an adaptive user interface.

In some embodiments of method 500, generating the response to the user input further comprises: aggregating results of the one or more of the supported actions; formatting the aggregated results into a user-friendly format; and presenting the formatted aggregated results to a user through the adaptive user interface.

In some embodiments of method 500, the user-friendly format includes at least one of text, speech, visual elements, or interactive components that is specific to a respective action of the one or more of the supported actions.

In some embodiments of method 500, converting the user input and the one or more supported actions into the unified schema comprises: identifying entities and intents associated with the user input; and mapping the identified entities and intents to corresponding elements in the unified schema.

In some embodiments of method 500, initiating the one or more supported actions comprises: prioritizing the one or more matched actions based on a set of criteria to obtain prioritized one or more matched actions; and executing the prioritized one or more matched actions in a sequential order.

In some embodiments of method 500, the set of predefined criteria includes at least one of user preferences, action relevance, or action complexity.

Method 500 provides a technical solution to the challenges of processing multi-modal user inputs and dynamically triggering and orchestrating a series of actions in response. Method 500 addresses the technical problems of handling diverse input modalities, understanding user intent, mapping inputs to appropriate actions, and executing those actions in a contextually relevant manner.

By converting user input and supported actions into a unified schema (block 504), method 500 standardizes the representation of data, making it easier to process and interpret user intent consistently across different modalities. The application of moderation rules (block 506) filters out irrelevant information and ensures the input adheres to specific formatting, enhancing the accuracy and efficiency of the system. The generation of prompts based on moderated input and influencing examples (block 508) enables the system to provide contextually relevant guidance to the language models, improving their understanding of user intent and the desired format of the response. Processing the prompt using LLMs (block 510) allows for natural language understanding and the ability to map user inputs to appropriate actions accurately. Augmenting matched actions with additional data (block 512) ensures that the actions have sufficient context for successful execution, enhancing the system's ability to handle complex tasks. Initiating supported actions based on matched actions and populated data models (block 514) enables the dynamic orchestration of actions in response to user input. This allows for a flexible and adaptable system that can handle a wide range of user requests and provide personalized responses. Generating a response based on the results of executed actions (block 516) completes the feedback loop, providing users with relevant and actionable information based on their input. This enhances the user experience and enables efficient task completion.

Note that FIG. 5 is just one example of a method, and other methods including fewer, additional, or alternative operations are possible consistent with this disclosure.

Example Method for Providing an Adaptive User Interface Based on Multi-Modality Inputs FIG. 6 depicts an example method 600 for providing an adaptive user interface based on multi-modality inputs. In one aspect, method 600 can be implemented by the system 100 FIG. 1 and/or processing system 700 of FIG. 7.

Method 600 starts at block 602 with receiving user input through one or more input modalities. In some embodiments of method 600, the input modalities include at least one of voice, image, or text. In some aspects, block 602 of method 600 corresponds to the functionality of the input component 102 described in FIG. 1, which receives user input through various modalities such as voice, image, or text.

Method 600 continues to block 604 with converting the user input into a unified schema. In some aspects, block 604 corresponds to the functionality of the orchestration system 104 and action(s) framework 106 described in FIG. 1 and FIG. 2A. In some aspects, the user input is converted into a unified schema representation by the schema block 204.

Method 600 continues to block 606 with obtaining one or more matched actions based on the unified schema. In some aspects, block 606 corresponds to the functionality of the models 116 described in FIG. 2B, which process the unified schema to obtain matched actions 222 relevant to the user input.

Method 600 continues to block 608 with identifying user interface requirements for one or more matched actions. In some aspects, block 608 corresponds to the functionality of the module registry 120 described in FIG. 3, which maintains a mapping between actions and their corresponding user interface requirements and elements.

Method 600 continues to block 610 with dynamically generating an adaptive user interface incorporating user interface elements tailored to the user interface requirements for one or more matched actions. In some aspects, block 610 corresponds to the functionality of the action(s) framework 106 and module registry 120 described in FIGS. 1 3, which dynamically generate an adaptive user interface incorporating user interface elements tailored to the requirements of the matched actions.

Method 600 ends at block 612 with causing the adaptive user interface to be displayed to a user. In some embodiments of method 600, the user interface elements are configured to facilitate user interaction and execution of the one or more matched actions. In some aspects, block 612 corresponds to the functionality of displaying the generated adaptive user interface to the user, as described in FIG. 4B, where the selected adaptive user interface 412 is populated with processed data and presented to the user for interaction and execution of the matched actions.

In some embodiments of method 600, converting the user input into the unified schema comprises: identifying entities and intents associated with the user input; and mapping the identified entities and intents to corresponding elements in the unified schema.

In some embodiments of method 600, obtaining one or more matched actions based on the unified schema comprises: processing the unified schema using one or more machine learning models to determine relevant actions; and assigning confidence scores to the relevant actions indicating their relevance to the user input.

In some embodiments of method 600, identifying user interface requirements for one or more matched actions comprises: retrieving user interface templates associated with one or more matched actions from a module registry; and customizing the user interface templates based on user preferences and device capabilities.

In some embodiments of method 600, dynamically generating the adaptive user interface comprises: selecting user interface elements from a library of reusable components based on the identified user interface requirements; and assembling the selected user interface elements into an user interface layout.

In some embodiments, method 600 further comprises: receiving user interactions through the adaptive user interface; updating the one or more matched actions and user interface elements based on the user interactions; and dynamically adjusting the adaptive user interface to reflect one or more updated actions and elements.

In some embodiments, method 600 further comprises: executing the one or more matched actions based on user interactions with the adaptive user interface; aggregating results of one or more executed actions; and presenting the aggregated results through the adaptive user interface.

Method 600 provides a technical solution to the challenge of providing an adaptive and intuitive user interface that dynamically adjusts based on the user's input and the matched actions determined by the system 100 (FIG. 1). The method addresses the technical problems of efficiently mapping user inputs to relevant actions, identifying appropriate user interface elements, and generating an interface that facilitates seamless user interaction and execution of actions.

In some aspects, by converting user input into a unified schema (block 604), method 600 standardizes the representation of data, enabling consistent processing and interpretation of user intent across different modalities. This can streamline the process of obtaining matched actions based on the unified schema (block 606), as the system can leverage machine learning models to determine relevant actions accurately.

In some aspects, identifying user interface requirements for matched actions (block 608) allows the system to determine the most appropriate user interface elements and layouts for each specific action. This can ensure that the generated user interface is tailored to the user and the context of the matched actions, enhancing usability and efficiency.

In some aspects, dynamically generating an adaptive user interface (block 610) provides a flexible and personalized user experience. By incorporating user interface elements that are specifically tailored to the requirements of the matched actions, the system 100 (FIG. 1) can present an interface that is intuitive and easy to navigate, reducing cognitive load on the user and improving overall productivity.

In some aspects, displaying the adaptive user interface to the user (block 612) completes an interaction loop, allowing the user to view and interact with the dynamically generated interface. The user interface elements can be configured to facilitate user interaction and execution of the matched actions, enabling task completion and reducing the need for manual input or navigation.

Additional aspects of method 600 further enhance its technical benefits. For example, identifying entities and intents in the user input and mapping them to the unified schema improves the accuracy of action matching. As another example, processing the unified schema using machine learning models and assigning confidence scores to relevant actions ensures that the most appropriate actions are selected. As another example, retrieving user interface templates and customizing them based on user preferences and device capabilities allows for a personalized and optimized user experience. Further, selecting user interface elements from a library of reusable components and assembling them into a layout enables efficient generation of adaptive interfaces. Moreover, the ability to update matched actions and user interface elements based on user interactions and dynamically adjust the interface accordingly provides a responsive and interactive experience for a user.

Overall, method 600 provides a comprehensive technical solution for generating adaptive user interfaces that dynamically adjust to user inputs and matched actions. By utilizing a unified schema, machine learning models, and a modular approach to user interface generation, the method 600 enables personalized interactions between users and the system 100 (FIG. 1), which can enhance productivity and user satisfaction.

Note that FIG. 6 is just one example of a method, and other methods including fewer, additional, or alternative operations are possible consistent with this disclosure.

Figure 7:
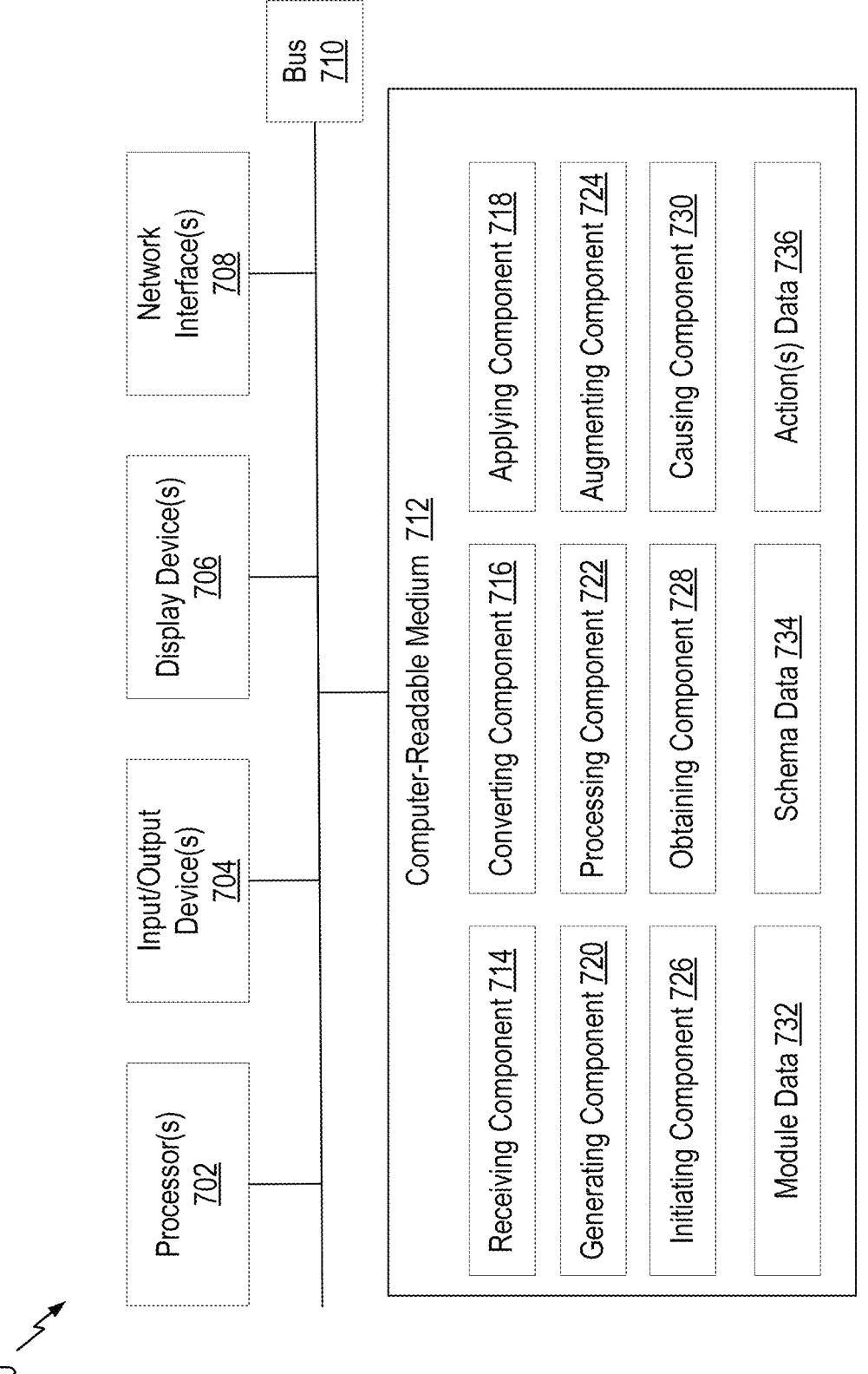
FIG. 7 depicts an example processing system with which aspects of the present disclosure can be performed.

Example Processing System for Processing Multi-Modality Inputs and Providing Adaptive User Interfaces FIG. 7 depicts an example processing system 700 configured to perform various aspects described herein, including, for example, method 500 as described above with respect to FIG. 5 and method 600 as described above with respect to FIG. 6.

Processing system 700 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 700 includes one or more processors 702, one or more input/output devices 704, one or more display devices 706, one or more network interfaces 708 through which processing system 700 is connected to one or more networks (e.g., a local network, an intranet, the Internet, or any other group of processing systems communicatively connected to each other), and computer-readable medium 712. In the depicted example, the aforementioned components are coupled by a bus 710, which may generally be configured for data exchange amongst the components. Bus 710 may be representative of multiple buses, while only one is depicted for simplicity.

Processor(s) 702 are generally configured to retrieve and execute instructions stored in one or more memories, including local memories like computer-readable medium 712, as well as remote memories and data stores. Similarly, processor(s) 702 are configured to store application data residing in local memories like the computer-readable medium 712, as well as remote memories and data stores. More generally, bus 710 is configured to transmit programming instructions and application data among the processor(s) 702, display device(s) 706, network interface(s) 708, and/or computer-readable medium 712. In certain embodiments, processor(s) 702 are representative of a one or more central processing units (CPUs), graphics processing unit (GPUs), tensor processing unit (TPUs), accelerators, and other processing devices.

Input/output device(s) 704 may include any device, mechanism, system, interactive display, and/or various other hardware and software components for communicating information between processing system 700 and a user of processing system 700. For example, input/output device(s) 704 may include input hardware, such as a keyboard, touch screen, button, microphone, speaker, and/or other device for receiving inputs from the user and sending outputs to the user.

Display device(s) 706 may generally include any sort of device configured to display data, information, graphics, user interface elements, and the like to a user. For example, display device(s) 706 may include internal and external displays such as an internal display of a tablet computer or an external display for a server computer or a projector. Display device(s) 706 may further include displays for devices, such as augmented, virtual, and/or extended reality devices. In various embodiments, display device(s) 706 may be configured to display a graphical user interface.

Network interface(s) 708 provide processing system 700 with access to external networks and thereby to external processing systems. Network interface(s) 708 can generally be any hardware and/or software capable of transmitting and/or receiving data via a wired or wireless network connection. Accordingly, network interface(s) 708 can include a communication transceiver for sending and/or receiving any wired and/or wireless communication.

Computer-readable medium 712 may be a volatile memory, such as a random access memory (RAM), or a nonvolatile memory, such as nonvolatile random access memory (NVRAM), or the like. In this example, computer-readable medium 712 includes receiving component 714, converting component 716, applying component 718, generating component 720, processing component 722, augmenting component 724, initiating component 726, obtaining component 728, causing component 730, module data 732, schema data 734, and action(s) data 736.

In certain embodiments, receiving component 714 is configured to receive user input through one or more input modalities, as described in block 502 of method 500 and block 602 of method 600. Converting component 716 is configured to convert the user input and supported actions into a unified schema, as described in block 504 of method 500 and block 604 of method 600. Applying component 718 is configured to apply moderation rules to the unified schema to generate a moderated input, as described in block 506 of method 500. Generating component 720 is configured to generate a prompt based on the moderated input and influencing examples, as described in block 508 of method 500. Processing component 722 is configured to process the prompt using LLMs to obtain matched actions and populated data models, as described in block 510 of method 500. Augmenting component 724 is configured to augment the matched actions with additional data, as described in block 512 of method 500. Initiating component 726 is configured to initiate supported actions based on the matched actions and populated data models, as described in block 514 of method 500. Obtaining component 728 is configured to obtain matched actions based on the unified schema, as described in block 606 of method 600. Causing component 730 is configured to cause the adaptive user interface to be displayed to a user, as described in block 612 of method 600. Module data 732, schema data 734, and action(s) data 736 store data related to the module registry, unified schema, and supported actions, respectively.

Note that FIG. 7 is just one example of a processing system consistent with aspects described herein, and other processing systems having additional, alternative, or fewer components are possible consistent with this disclosure.

Example Clauses

Implementation examples are described in the following numbered clauses:

Clause 1: A method for processing multi-modality inputs to trigger dynamic actions, the method comprising: receiving user input through one or more input modalities, wherein the input modalities include at least one of voice, image, or text; converting the user input and one or more supported actions obtained from an actions repository into a unified schema, wherein the unified schema represents the user input and the one or more supported actions in a standardized format; applying a set of moderation rules to the unified schema to generate a moderated input, including: filtering irrelevant or unnecessary information from the unified schema; and constraining the unified schema to adhere to specific formatting or structural requirements; generating a prompt based on the moderated input and one or more influencing examples;

processing the prompt using one or more LLMs to obtain one or more matched actions and populated data models, wherein the one or more matched actions represents a mapping between the user input and the one or more supported actions; augmenting the one or more matched actions with additional data, wherein the additional data provides context for executing the one or more matched actions; initiating one or more supported actions based on the one or more matched actions and populated data models; and generating a response to the user input based on results of executing the one or more supported actions.

Clause 2: A method according to Clause 1, wherein the one or more influencing examples includes at least one of: examples of desired response formats or structures; guidance on a tone, style, or level of formality to be used in the generated responses; or domain-specific terminology or conventions.

Clause 3: A method according to any one of Clauses 1-2, wherein generating the prompt based on the moderated input and the one or more influencing examples comprises: combining the moderated input and the one or more influencing examples into a single input format; and providing the combined moderated input to the one or more LLMs for processing.

Clause 4: A method according to any one of Clauses 1-3, wherein augmenting the one or more matched actions with additional data comprises: identifying missing or incomplete information in the one or more matched actions; and retrieving the missing or incomplete information from a data service.

Clause 5: A method according to any one of Clauses 1-4, wherein executing the one or more of the supported actions comprises executing the one or more of the supported actions through an adaptive user interface that dynamically adapts to specific requirements of a respective action of the one or more of the supported actions.

Clause 6: A method according to Clause 5, wherein the adaptive user interface comprises a set of reusable user interface components dynamically assembled based on requirements of each action.

Clause 7: A method according to any one of Clauses 1-6, wherein generating the response to the user input comprises presenting the response using an adaptive user interface.

Clause 8: A method according to Clause 7, wherein generating the response to the user input further comprises: aggregating results of the one or more of the supported actions; formatting the aggregated results into a user-friendly format; and presenting the formatted aggregated results to a user through the adaptive user interface.

Clause 9: A method according to Clause 8, wherein the user-friendly format includes at least one of text, speech, visual elements, or interactive components that is specific to a respective action of the one or more of the supported actions.

Clause 10: A method according to any one of Clauses 1-9, wherein converting the user input and the one or more supported actions into the unified schema comprises: identifying entities and intents associated with the user input; and mapping the identified entities and intents to corresponding elements in the unified schema.

Clause 11: A method according to any one of Clauses 1-10, wherein initiating the one or more supported actions comprises: prioritizing the one or more matched actions based on a set of criteria to obtain prioritized one or more matched actions; and executing the prioritized one or more matched actions in a sequential order.

Clause 12: A method according to Clause 11, wherein the set of predefined criteria includes at least one of user preferences, action relevance, or action complexity.

Clause 13: A method for providing an adaptive user interface based on multi-modality inputs, the method comprising: receiving user input through one or more input modalities; converting the user input into a unified schema; obtaining one or more matched actions based on the unified schema; identifying user interface requirements for one or more matched actions; dynamically generating an adaptive user interface incorporating user interface elements tailored to the user interface requirements for one or more matched actions; and causing the adaptive user interface to be displayed to a user, wherein the user interface elements are configured to facilitate user interaction and execution of the one or more matched actions.

Clause 14: A method according to Clause 13, wherein converting the user input into the unified schema comprises: identifying entities and intents associated with the user input; and mapping the identified entities and intents to corresponding elements in the unified schema.

Clause 15: A method according to any one of Clauses 13-14, wherein obtaining one or more matched actions based on the unified schema comprises: processing the unified schema using one or more machine learning models to determine relevant actions; and assigning confidence scores to the relevant actions indicating their relevance to the user input.

Clause 16: A method according to any one of Clauses 13-15, wherein identifying user interface requirements for one or more matched actions comprises: retrieving user interface templates associated with one or more matched actions from a module registry; and customizing the user interface templates based on user preferences and device capabilities.

Clause 17: A method according to any one of Clauses 13-16, wherein dynamically generating the adaptive user interface comprises: selecting user interface elements from a library of reusable components based on the identified user interface requirements; and assembling the selected user interface elements into an user interface layout.

Clause 18: A method according to any one of Clauses 13-17, further comprising: receiving user interactions through the adaptive user interface; updating the one or more matched actions and user interface elements based on the user interactions; and dynamically adjusting the adaptive user interface to reflect one or more updated actions and elements.

Clause 19: A method according to any one of Clauses 13-18, further comprising: executing the one or more matched actions based on user interactions with the adaptive user interface; aggregating results of one or more executed actions; and presenting the aggregated results through the adaptive user interface.

Clause 20: A processing system, comprising: a memory comprising computer-executable instructions; and a processor configured to execute the computer-executable instructions and cause the processing system to perform a method in accordance with any one of Clauses 1-19.

Clause 21: A processing system, comprising means for performing a method in accordance with any one of Clauses 1-19.

Clause 22: A non-transitory computer-readable medium storing program code for causing a processing system to perform the steps of any one of Clauses 1-19.

Clause 23: A computer program product embodied on a computer-readable storage medium comprising code for performing a method in accordance with any one of Clauses 1-19.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for processing multi-modality inputs to trigger dynamic actions, the method comprising:

receiving user input through one or more input modalities, wherein the one or more input modalities include at least one of voice, image, or text;

converting the user input and one or more supported actions obtained from an actions repository into a unified schema, wherein the unified schema represents the user input and the one or more supported actions in a standardized format;

applying a set of moderation rules to the unified schema to generate a moderated input, including:

filtering irrelevant or unnecessary information from the unified schema; and constraining the unified schema to adhere to specific formatting or structural requirements;

generating a prompt based on the moderated input and one or more influencing examples;

processing the prompt using one or more Large Language Models (LLMs) to obtain one or more matched actions and populated data models, wherein the one or more matched actions represents a mapping between the user input and the one or more supported actions;

augmenting the one or more matched actions with additional data, wherein the additional data provides context for executing the one or more matched actions;

initiating one or more supported actions based on the one or more matched actions and populated data models; and generating a response to the user input based on results of executing the one or more supported actions.

2. The method of claim 1, wherein the one or more influencing examples includes at least one of: examples of desired response formats or structures; guidance on a tone, style, or level of formality to be used in the generated responses; or domain-specific terminology or conventions.

3. The method of claim 1, wherein generating the prompt based on the moderated input and the one or more influencing examples comprises:

combining the moderated input and the one or more influencing examples into a single input format; and providing the combined moderated input to the one or more LLMs for processing.

4. The method of claim 1, wherein augmenting the one or more matched actions with additional data comprises:

identifying missing or incomplete information in the one or more matched actions; and retrieving the missing or incomplete information from a data service.

5. The method of claim 1, wherein executing the one or more of the supported actions comprises executing the one or more of the supported actions through an adaptive user interface that dynamically adapts to specific requirements of a respective action of the one or more of the supported actions.

6. The method of claim 5, wherein the adaptive user interface comprises a set of reusable user interface components dynamically assembled based on requirements of each action.

7. The method of claim 1, wherein generating the response to the user input comprises presenting the response using an adaptive user interface.

8. The method of claim 7, wherein generating the response to the user input further comprises:

aggregating results of the one or more of the supported actions;

formatting the aggregated results into a user-friendly format; and presenting the formatted aggregated results to a user through the adaptive user interface.

9. The method of claim 8, wherein the user-friendly format includes at least one of text, speech, visual elements, or interactive components that is specific to a respective action of the one or more of the supported actions.

10. The method of claim 1, wherein converting the user input and the one or more supported actions into the unified schema comprises:

identifying entities and intents associated with the user input; and mapping the identified entities and intents to corresponding elements in the unified schema.

11. The method of claim 1, wherein initiating the one or more supported actions comprises:

prioritizing the one or more matched actions based on a set of criteria to obtain prioritized one or more matched actions; and executing the prioritized one or more matched actions in a sequential order.

12. The method of claim 11, wherein the set of predefined criteria includes at least one of user preferences, action relevance, or action complexity.

13. A processing system, comprising:

a memory comprising computer-executable instructions; and a processor configured to execute the computer-executable instructions and cause the processing system to:

receive user input through one or more input modalities, wherein the one or more input modalities include at least one of voice, image, or text;

the user input and one or more supported actions obtained from an actions repository into a unified schema, wherein the unified schema represents the user input and the one or more supported actions in a standardized format;

apply a set of moderation rules to the unified schema to generate a moderated input, wherein to apply the set of moderation rules to the unified schema comprises:

to filter out irrelevant or unnecessary information from the unified schema, and to constrain the unified schema to adhere to specific formatting or structural requirements;

generate a prompt based on the moderated input and one or more influencing examples;

process the prompt with one or more Large Language Models (LLMs) to obtain one or more matched actions and populated data models, wherein the one or more matched actions represents a mapping between the user input and the one or more supported actions;

augment the one or more matched actions with additional data, wherein the additional data provides context for executing the one or more matched actions;

initiate one or more of the one or more supported actions based on the one or more matched actions and populated data models; and generate a response to the user input based on results of executing the one or more supported actions.

14. The processing system of claim 13, wherein to generate the prompt based on the moderated input and the one or more influencing examples, the computer-executable instructions are further executable by the processor to cause the processing system to:

combine the moderated input and the one or more influencing examples into a single input format; and provide the combined moderated input to the one or more LLMs for processing.

15. The processing system of claim 13, wherein to augment the one or more matched actions with additional data, the computer-executable instructions are further executable by the processor to cause the processing system to:

identify missing or incomplete information in the one or more matched actions; and retrieve the missing or incomplete information from a data service.

16. The processing system of claim 13, wherein to execute one or more of the supported actions, the computer-executable instructions are further executable by the processor to cause the processing system to execute one or more of the supported actions through an adaptive user interface that dynamically adapts to specific requirements of a respective action of the one or more of the supported actions.

17. The processing system of claim 13, wherein to generate the response to the user input, the computer-executable instructions are further executable by the processor to cause the processing system to present the response using an adaptive user interface.

18. The processing system of claim 17, wherein to generate the response to the user input, the computer-executable instructions are further executable by the processor to cause the processing system to:

aggregate results of the one or more of the supported actions;

format the aggregated results into a user-friendly format; and present the formatted aggregated results to a user through the adaptive user interface.

19. The processing system of claim 13, wherein to convert the user input and the one or more supported actions into the unified schema, the computer-executable instructions are 5 further executable by the processor to cause the processing system to:

identify entities and intents associated with the user input; and map the identified entities and intents to corresponding 10 elements in the unified schema.

20. The processing system of claim 13, wherein to initiate the one or more supported actions, the computer-executable instructions are further executable by the processor to cause the processing system to: 15 prioritize the one or more matched actions based on a set of criteria to obtain prioritized one or more matched actions; and execute the prioritized one or more matched actions in a sequential order. 20

* * * * *